United States Patent
Benkreira et al.

(10) Patent No.: US 10,679,451 B2
(45) Date of Patent: Jun. 9, 2020

(54) USER ALERTS BASED ON IMAGE CAPTURING BY A BILL STORAGE DEVICE

(71) Applicant: Capital One Services, LLC, McLean, VA (US)

(72) Inventors: Abdelkadar M'Hamed Benkreira, Washington, DC (US); Michael Mossoba, Arlington, VA (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/236,996

(22) Filed: Dec. 31, 2018

(65) Prior Publication Data
US 2019/0311566 A1 Oct. 10, 2019

Related U.S. Application Data

(63) Continuation of application No. 15/947,142, filed on Apr. 6, 2018, now Pat. No. 10,169,946.

(51) Int. Cl.
*G06K 7/00* (2006.01)
*G07D 11/24* (2019.01)
(Continued)

(52) U.S. Cl.
CPC .............. *G07D 11/24* (2019.01); *G06F 3/016* (2013.01); *G06F 3/167* (2013.01); *G06Q 20/1085* (2013.01); *G06Q 20/3221* (2013.01); *G07D 7/12* (2013.01); *G07D 11/16* (2019.01); *G07D 11/28* (2019.01); *G07D 11/36* (2019.01);
(Continued)

(58) Field of Classification Search
USPC ............. 235/375–385, 435, 439, 451; 705/5, 705/35–45
See application file for complete search history.

(56) References Cited

U.S. PATENT DOCUMENTS

| 8,594,414 | B1 | 11/2013 | Jones |
| 10,169,946 | B1 * | 1/2019 | Benkreira ............. G07F 19/202 |
| 2011/0087985 | A1 | 4/2011 | Buchanan |

FOREIGN PATENT DOCUMENTS

CN 205306192 U 6/2016

OTHER PUBLICATIONS

Miller, "This smart wallet has a built-in camera for catching thieves", Jul. 5, 2017, 5 pages.

* cited by examiner

*Primary Examiner* — Matthew Mikels
(74) *Attorney, Agent, or Firm* — Harrity & Harrity, LLP

(57) ABSTRACT

A device monitors activity associated with a user of a currency bill storage device based on currency bill data received from the currency bill storage device over a period of time. The currency bill storage device includes image sensor(s) configured to capture images of currency bills. The currency bill data is based on the images. The device tracks a balance in the currency bill storage device based on the currency bill data and identifies, based on the activity, an upcoming transaction in which the user is expected to utilize a particular quantity of currency bills in the currency bill storage device. The device determines whether the balance is sufficient relative to the particular quantity of currency bills and performs one or more actions to cause an alert to be provided to the user based on determining whether the balance is sufficient relative to the particular quantity of currency bills.

20 Claims, 6 Drawing Sheets

(51) Int. Cl.
*G06Q 20/32* (2012.01)
*G07D 7/12* (2016.01)
*G06F 3/16* (2006.01)
*G06F 3/01* (2006.01)
*G07D 11/16* (2019.01)
*G07D 11/28* (2019.01)
*G07D 11/36* (2019.01)
*G07D 11/50* (2019.01)
*G06Q 20/10* (2012.01)
*G07F 19/00* (2006.01)

(52) U.S. Cl.
CPC ............ *G07D 11/50* (2019.01); *G07F 19/202* (2013.01); *G07F 19/209* (2013.01)

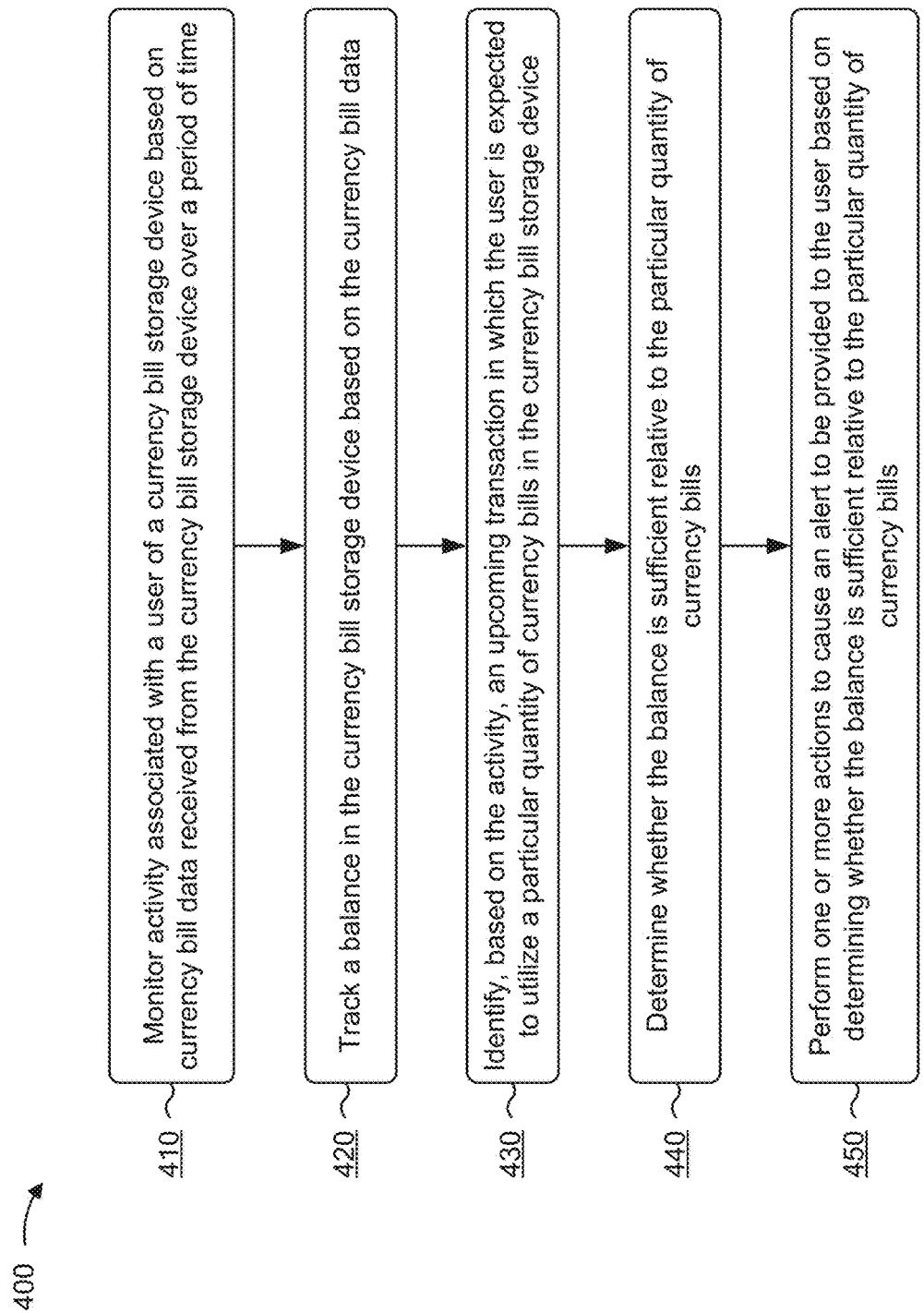

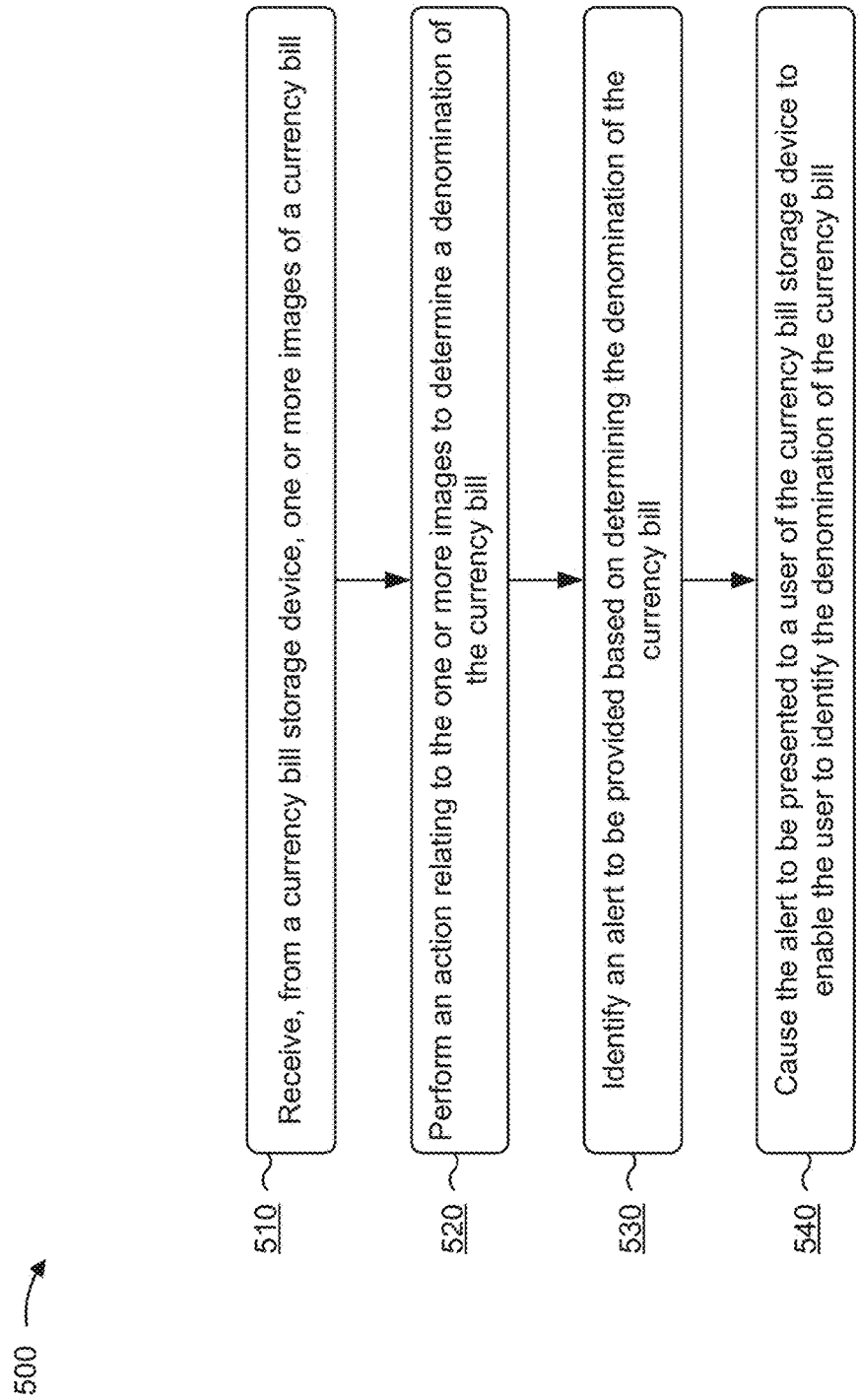

USER ALERTS BASED ON IMAGE CAPTURING BY A BILL STORAGE DEVICE

RELATED APPLICATION

This application is a continuation of U.S. patent application Ser. No. 15/947,142, filed Apr. 6, 2018 (now U.S. Pat. No. 10,169,946), which is incorporated herein by reference.

BACKGROUND

Braille is a tactile writing system that can be read using the fingers. Reading or identifying documents, without a system such as braille, can be challenging for those who are visually impaired.

SUMMARY

According to some possible implementations, a method may include monitoring, by a user device, activity associated with a user of a currency bill storage device based on currency bill data received from the currency bill storage device over a period of time, where the currency bill storage device may include one or more image sensors configured to capture images of currency bills, where the currency bill data may be based on the images; tracking, by the user device, a balance in the currency bill storage device based on the currency bill data; identifying, by the user device and based on the activity, an upcoming transaction in which the user is expected to utilize a particular quantity of currency bills in the currency bill storage device; determining, by the user device, whether the balance is sufficient relative to the particular quantity of currency bills; and performing, by the user device, one or more actions to cause an alert to be provided to the user based on determining whether the balance is sufficient relative to the particular quantity of currency bills.

According to some possible implementations, a device may include one or more memories; and one or more processors, communicatively coupled to the one or more memories, configured to monitor activity associated with a user of a wallet or a purse based on currency bill data received from the wallet or the purse over a period of time, where the wallet or the purse may include one or more image sensors configured to capture images of currency bills, where the currency bill data may be based on the images; track a balance in the wallet or the purse based on the currency bill data; identify, based on the activity, an upcoming transaction in which the user is expected to utilize a quantity of currency bills in the wallet or the purse; determine whether the balance is sufficient relative to the quantity of currency bills in the wallet or the purse after identifying the upcoming transaction; and perform one or more actions to cause an alert to be provided to the user based on determining that the balance is insufficient relative to the quantity of currency bills.

According to some possible implementations, a non-transitory computer-readable medium may store instructions, where the instructions may include one or more instructions that, when executed by one or more processors, cause the one or more processors to receive, from a currency bill storage device, one or more images of a currency bill, where the currency bill storage device may be a wallet or a purse, where the currency bill storage device may include one or more image sensors, where the one or more images may be captured by the one or more image sensors; perform an action relating to the one or more images to determine a denomination of the currency bill; identify an alert to be provided based on determining the denomination of the currency bill, where the alert may include an audio-based alert or a haptic-based alert; and cause the alert to be presented to a user of the currency bill storage device to enable the user to identify the denomination of the currency bill.

BRIEF DESCRIPTION OF THE DRAWINGS

FIG. 4 is a flow chart of an example process for providing alerts based on user activity relating to currency bill usage; and FIG. 5 is a flow chart of an example process for providing alerts based on detected currency bill denominations.

DETAILED DESCRIPTION

The following detailed description of example implementations refers to the accompanying drawings. The same reference numbers in different drawings may identify the same or similar elements.

In many countries, such as the United States, currency bills do not include tactile indicators, such as braille-based raised dots and/or the like, that enable a visually impaired person to identify the denomination of a bill. It can, therefore, be challenging for such a person when providing bills to, or receiving bills from, a counter-party. For example, the person may have little choice but to trust a counter-party's word—i.e., that the person is not overpaying the counter-party or is not being underpaid by the counter-party.

Some implementations, described herein, provide a currency bill storage device (e.g., a physical wallet, a purse, and/or the like) that is capable of capturing images of currency bills, and providing the images, and/or information relating to the images, to a user device. In some implementations, the user device is capable of providing alerts (e.g., audible and/or haptic alerts) regarding the denominations of the currency bills based on the images or information. In some implementations, the user device may monitor a user's activities relating to usage of currency bills (e.g., at various locations over time), track a balance of currency bills in the currency bill storage device, and provide alerts to the user regarding the balance and any potential upcoming transactions in which the user is expected to utilize a certain quantity of currency bills corresponding to an amount that exceeds the balance.

In this way, a visually impaired user can easily identify the denominations of currency bills using a currency bill storage device that is in a familiar form factor (e.g., a wallet, a purse, and/or the like), which reduces or eliminates a need for the user to purchase and/or utilize a separate bill reader (which may be difficult to operate and/or cumbersome to carry around), thereby reducing costs. In addition, the tracking of a balance in a currency bill storage device and the monitoring of user activity relating to currency bill usage enables banking to be more accessible to a visually impaired user, and reduces a need for the user to install and/or utilize other financial management applications on a user device, which conserves power, computing resources, and memory resources of the user device.

Figure 1A:
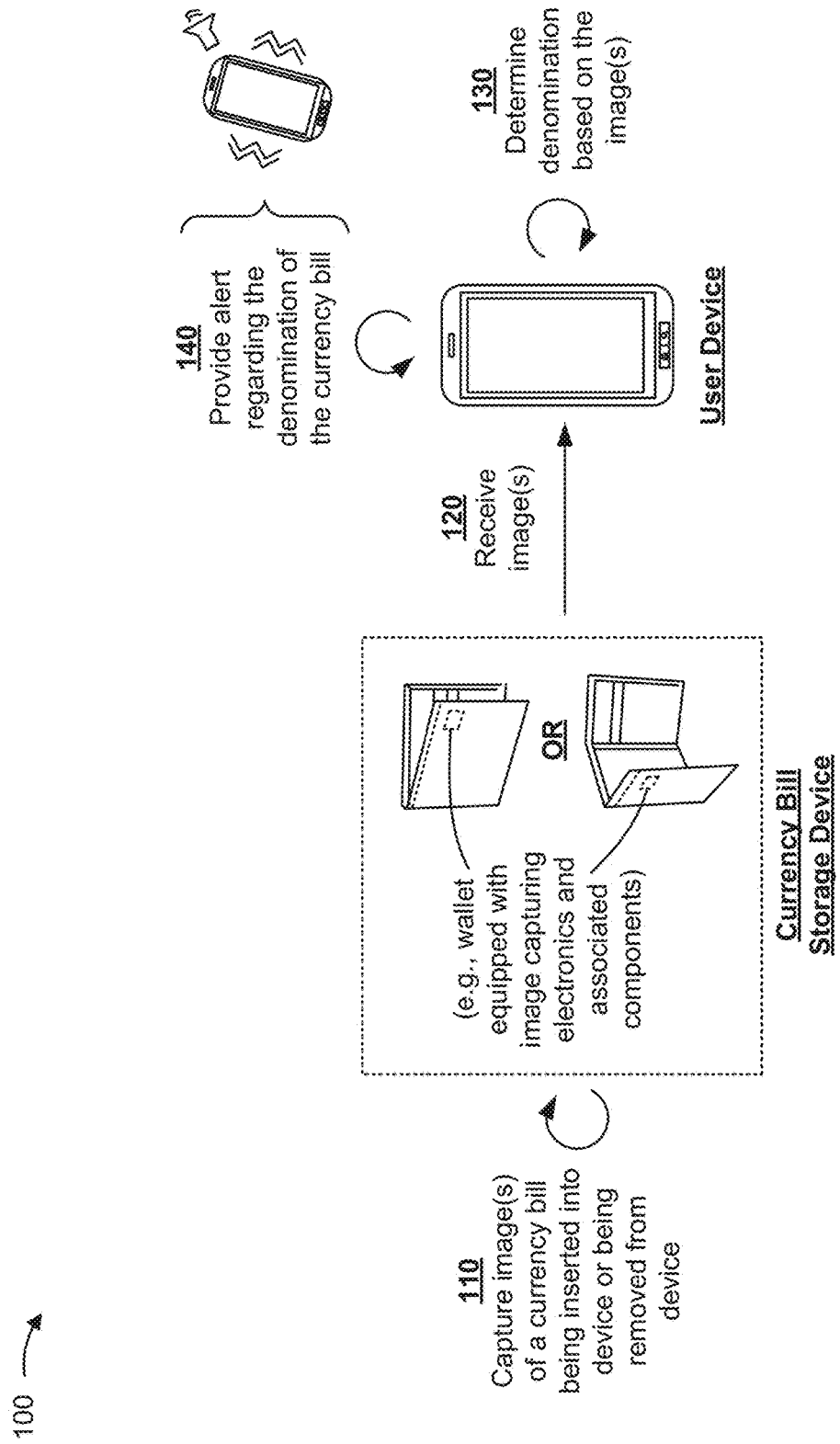
FIGS. 1A and 1B are diagrams of an overview of an example implementation described herein.
Figure 1B:
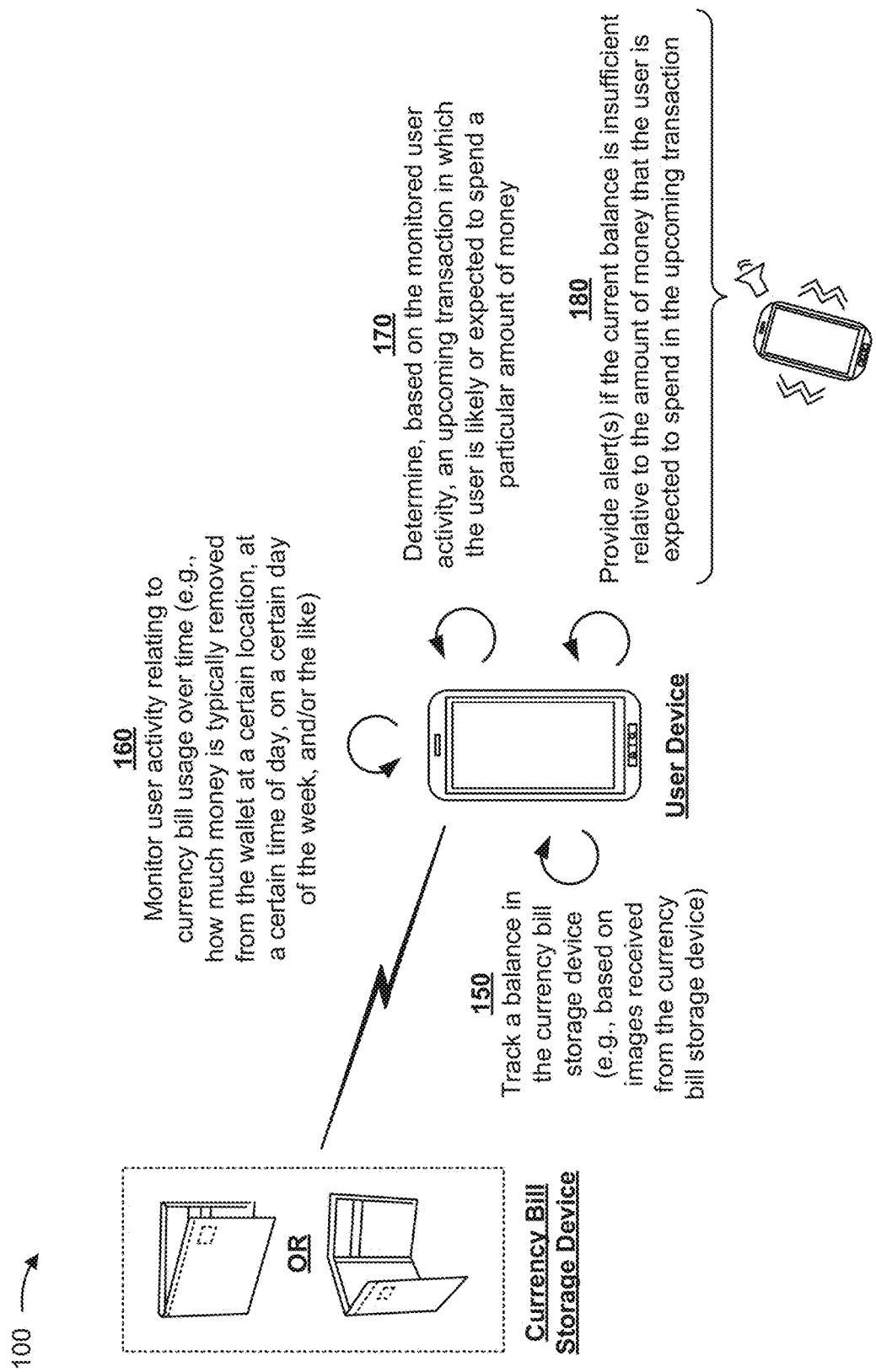

FIGS. 1A and 1B are diagrams of an overview of an example implementation 100 described herein.

As shown in FIGS. 1A and 1B, example implementation 100 may include a currency bill storage device and a user device. The currency bill storage device may include a wallet, a purse, a pocketbook, and/or the like, and may include a processor (e.g., one or more processors, such as one or more microcontrollers) and various components communicatively coupled to the processor, such as, for example, a memory (e.g., one or more memory devices), an image sensor (e.g., one or more image sensors, such as one or more cameras), a power source (e.g., one or more power sources, such as one or more batteries), a communication interface (e.g., one or more wired and/or wireless interfaces, such as a Bluetooth-based interface, a Wi-Fi interface, and/or the like), and/or the like.

In some implementations, the components of the currency bill storage device may be included on or within a body of the currency bill storage device. For example, where the currency bill storage device includes a wallet, components, such as the processor, the memory, the power source, and the communication interface, may be located within a fabric of the wallet so as to be hidden from view, and the image sensor may be located on a surface of the fabric so as to be exposed for image capturing purposes.

In some implementations, and to avoid any electromagnetic interference, from electrical and/or electronic components of the currency bill storage device, that might affect the operability of certain radio-frequency (RF)-based cards (such as transportation-related cards or other cards that include RF components) in the currency bill storage device, the currency bill storage device may include one or more storage areas located proximate to an outer surface of the currency bill storage device (e.g., one or more pockets and/or the like located within the wallet, but proximate to the outer surface of the wallet) for storing such cards.

In some implementations, the currency bill storage device may include one or more wired charging mechanisms coupled to the power source that permit recharging of the power source. Additionally, or alternatively, the power source may be configured to be charged wirelessly (e.g., via inductive charging and/or the like), in which case, the currency bill storage device may or may not include any wired charging mechanisms.

In some implementations, the image sensor may be located on a portion of the currency bill storage device that permits the image sensor to capture portions of a currency bill when the currency bill is positioned in or near the currency bill storage device. For example, the image sensor may be located at a corner of an inner storage area of the currency bill storage device (that stores currency bills) such that the image sensor may capture images of corner portion(s) of currency bills (which is where denomination information is typically depicted). In a case where the currency bill storage device includes multiple image sensors (e.g., two or more image sensors), the image sensors may be positioned at different corners of the inner storage area (e.g., a first image sensor may be positioned at a top corner of an inner storage area (e.g., as shown in FIG. 1A), and a second image sensor—not shown—may be positioned at a bottom corner of the inner storage area beneath the first image sensor).

In some implementations, one or more image sensors may be positioned at one or more other locations of the currency bill storage device, such as at, or near, a center area within the inner storage area to permit image capturing of a center portion of a currency bill (which is where an image (e.g., of a person, of text, or of another object), that can be used to determine a denomination of the currency bill, is typically depicted).

In some implementations, the currency bill storage device may include an illumination source (e.g., one or more illumination sources, such as one or more light emitting diodes (LEDs) and/or the like) that may provide lighting during image capturing by the image sensor. In some implementations, the image sensor may include an infrared camera that is capable of operating in low-light environments. In such cases, the currency bill storage device may or may not include any illumination sources.

In some implementations, the components of the currency bill storage device may operate in different modes. For example, the different modes may include a normal mode in which the components operate at normal or full power, a low-power mode (e.g., a sleep mode) in which the components operate at less than normal or full power, and/or the like.

In some implementations, a detection of light by the image sensor may be utilized to control the operating modes of the various components of the currency bill storage device. Additionally, or alternatively, the currency bill storage device may include one or more ambient light sensors (not shown) that may be used to control the operating modes of the various components. In either case, the processor may receive one or more signals (e.g., from the image sensor and/or the ambient light sensor(s)) corresponding to a detected intensity of light, and may control the operating modes of the various components accordingly.

For example, when the currency bill storage device is accessed (e.g., is flipped open, unzipped, and/or the like), the image sensor and/or the ambient light sensor(s) may detect a high level of light intensity, in which case the processor may control the various components to operate in a normal mode. Conversely, and as another example, when the currency bill storage device is closed (e.g., is flipped closed, zipped up, and/or the like), the image sensor and/or the ambient light sensor(s) may detect a low level of light intensity, in which case the processor may control the various components to operate in a low-power mode. This permits, for example, the currency bill storage device to "sleep" when the currency bill storage device is placed away and/or idle (e.g., such as when placed inside of a pocket, when left idle during nighttime hours, and/or the like), which conserves power resources of the currency bill storage device.

Additionally, or alternatively, and in some implementations, the currency bill storage device may include a motion sensor (e.g., one or more motion sensors, such as one or more accelerometers and/or the like) configured to detect use, or access, of the currency bill storage device (e.g., when a user picks up the currency bill storage device at a certain speed, at a particular orientation, and/or the like). In some implementations, a detection, by the motion sensor, of movement and/or an orientation of the currency bill storage device may be utilized to control the operating modes of the various components of the currency bill storage device. In such cases, the motion sensor may provide, to the processor, one or more signals corresponding to the movement and/or orientation of the currency bill storage device. For example, when the currency bill storage device is accessed and held in a particular orientation (e.g., in an upright position), the motion sensor may provide one or more corresponding signals to the processor, which the processor may utilize to control the various components to operate in a normal mode. Conversely, and as another example, when the currency bill storage device is placed down and/or not held in the particular orientation (e.g., not in the upright position), the motion sensor may provide one or more corresponding signals to the processor, which the processor may utilize to control the various components to operate in a low-power mode.

In this way, the currency bill storage device can operate in different modes to enable conservation of power and/or optimization of the functionality of the various components of the currency bill storage device.

In some implementations, the currency bill storage device may include one or more applications and/or processes that, when executed by the processor, facilitate image capturing of currency bills (and/or other objects, such as ID cards, credit cards, business cards, gift cards, receipts, transportation-related cards, and/or the like), facilitate data communications with the user device, and/or the like.

In some implementations, the user device may include a smartphone, a smart watch, and/or the like. In some implementations, the user device may include one or more applications and/or processes that, when executed by one or more processors of the user device, facilitate data communications with the currency bill storage device, facilitate processing of data relating to the currency bill storage device, and/or the like.

As shown in FIG. 1A, and as shown by reference number 110, the currency bill storage device may capture image(s) of a currency bill being inserted into the currency bill storage device or being removed from the currency bill storage device. In some implementations, the image sensor may detect the currency bill, during insertion or removal of the currency bill, and may capture image(s) of the currency bill based on the detection. In some implementations, the image sensor may detect light at an intensity that satisfies (e.g., exceeds) a threshold intensity (e.g., when the currency bill storage device is opened or accessed), and may initiate capturing of image(s) based on the detection.

In some implementations, and as described above, the currency bill storage device may include only a single image sensor (e.g., a single camera) positioned at a top corner or a bottom corner of and within an inner storage area of the currency bill storage device. In this case, the single image sensor may capture multiple images (e.g., a series of images over a period of time) that, when analyzed, can indicate whether a currency bill is being inserted into the currency bill storage device or being removed from the currency bill storage device.

Additionally, or alternatively, and as described above, the currency bill storage device may include two or more image sensors (e.g., two or more cameras)—e.g., one image sensor located at or near a top corner of, and within, an inner storage area of the currency bill storage device, and a second image sensor located at or near a bottom corner of, and within, the inner storage area. In this case, the two image sensors may capture images (e.g., simultaneously, one after another, and/or the like) that, when analyzed, can indicate whether a currency bill is being inserted into the currency bill storage device or being removed from the currency bill storage device.

Additionally, or alternatively, the user device may provide an option for a user to input (e.g., via selection of an option displayed on a user interface presented on the user device, via a voice command, and/or the like) whether the user is inserting a currency bill into the currency bill storage device or removing a currency bill from the currency bill storage device. In this case, the user device may determine, based on the user selection, whether image(s) received from the currency bill storage device correspond to a currency bill that is being inserted into, or being removed from, the currency bill storage device.

As shown by reference number 120, the user device may receive the image(s) from the currency bill storage device. As shown by reference number 130, the user device may determine a denomination of a currency bill identified in the image(s). In some implementations, the user device may store and/or have access to information regarding denominations of currency bills (e.g., images of one or more portions of currency bills of different denominations and associated denomination value information). In this case, the user device may utilize this information to determine the denomination of a currency bill (e.g., by processing the image(s) received from the currency bill storage device, and comparing the stored images and the processed image(s)). Additionally, or alternatively, the user device may provide the image(s) to an external device (e.g., a server device that has access to such information), and request the external device to determine the denomination.

As shown by reference number 140, the user device may provide one or more alerts regarding the determined denomination of the currency bill. In some implementations, the user device may audibly provide an alert. For example, the user device may provide an audible alert that specifies the denomination of the currency bill, such as "1 dollar bill," "5 dollar bill," "10 dollar bill," and/or the like. Additionally, or alternatively, the user device may haptically provide an alert. For example, the user device may vibrate in accordance with different haptic patterns (e.g., of different durations), depending on the denomination of the currency bill. As one example, the user device may vibrate one time in a case where the denomination of the currency bill is 1 dollar, vibrate two times in a case where the denomination of the currency bill is 5 dollars, and/or the like. As another example, the user device may vibrate for a longer duration in a case where the currency bill is of a higher denomination, and for a shorter duration in a case where the currency bill is of a lower denomination.

In some implementations, if the user device is unable to determine a denomination of the currency bill, the user device may present one or more error messages (e.g., audibly, haptically, and/or the like) and/or prompt the user to repeat insertion (or removal) of the currency bill. In some cases, a user may insert an object (e.g., a receipt or another item) into the currency bill storage device, such as in the inner storage area of the currency bill storage device. In such cases, the user device may determine, from image(s) captured and provided by the currency bill storage device, that an object other than a currency bill has been inserted into the currency bill storage device, and may not present an error message to the user (e.g., so as to avoid providing error-related instructions in cases where the user is likely aware that what is being inserted into the currency bill storage device is not a currency bill). Rather, in such cases, the user device may simply notify (e.g., via an audio alert, via haptic feedback, and/or the like) that an object other than a currency bill has been inserted into the currency bill storage device.

In some implementations, the user device may determine a current location of the user device (e.g., using a global positioning system (GPS) receiver and/or the like), and determine the appropriate currency (e.g., United States dollar, Canadian dollar, and/or the like) that is in use at the current location. In such cases, if the user removes, from the currency bill storage device (or inserts into the currency bill storage device), a currency bill that is not in the appropriate currency for the current location, the user device may present one or more corresponding alerts (e.g., an audio alert, a haptic-based alert, and/or the like) to notify the user.

In some implementations, the user device may be configured to perform balance-related functions, track patterns of a user's usage of currency bills, and provide alerts and/or suggestions to a user based on balance information and the patterns of usage of currency bills.

As shown in FIG. 1B, and as shown by reference number 150, the user device may track a balance of currency bills in the currency bill storage device. In some implementations, the user device may track the balance based on images received from the currency bill storage device (e.g., based on denominations of currency bills determined based on the images, as described above with respect to reference numbers 120 and 130). For example, the user device may track each insertion of a currency bill into the currency bill storage device and each removal of a currency bill from the currency bill storage device, and maintain a current balance of the currency bills in the currency bill storage device. In some implementations, the user device may track a quantity of currency bills that correspond to each of one or more denominations. In this way, the user device may determine, at any point, a current balance in the currency bill storage device as well as the currency bills that make up that balance (e.g., a current balance of $50 made up of three $10 bills, two $5 bills, and ten $1 bills).

As shown by reference number 160, the user device may monitor user activity relating to currency bill usage over time. In some implementations, the user device may continuously or periodically track the location of the currency bill storage device and/or the user device, and monitor the user's activities (e.g., based on events, such as insertion of currency bills into the currency bill storage device and/or removal of currency bills from the currency bill storage device, and/or the like) at various locations over time (e.g., at certain times of day, days of the week, days of the month, days of the year, and/or the like).

As shown by reference number 170, the user device may determine an upcoming transaction in which the user is likely or expected to spend a particular amount of money based on the monitored user activity. For example, the user device may determine that a user typically visits a mall and removes a certain amount of money from the currency bill storage device (e.g., to purchase a particular item) every Friday evening around 7 pm. Continuing the example, the user device may, based on monitoring of such past behavior of the user and based on the current balance in the currency bill storage device maintained by the user device, determine whether there are sufficient funds in the currency bill storage device for the user's visit. In some implementations, the user device may perform the determination at a time prior to the user proceeding to the mall (e.g., at a time prior to the usual visit, such as an hour before the user proceeds to the mall).

In some implementations, the user device may identify a pattern of usage of currency bills after a user has repeated a spending action a threshold quantity of times (e.g., once, twice, three times, and/or the like). For example, the user device may determine that a user typically visits the mall every Friday evening around 7 pm and spends a certain amount of money in the currency bill storage device after the user device has tracked and identified this to occur on two consecutive Fridays, three consecutive Fridays, and/or the like. In some implementations, the user device may identify an upcoming transaction based on information contained in one or more calendar entries (e.g., stored in the user device), based on the content of one or more e-mails (e.g., sent by the user device and/or received by the user device), based on the substance of one or more voicemail messages (e.g., received by the user device and/or provided by the user via the user device), and/or the like.

In some implementations, the user device may use one or more machine learning algorithms configured to learn a user's spending patterns. For example, in some implementations, the user device may provide information regarding a user's spending patterns as input to one or more machine learning algorithms, which may perform machine learning to automate future determinations or predictions of upcoming transactions. For example, the user device may train a machine learning algorithm based on known inputs (e.g., insertion of currency bills into the currency bill storage device and/or removal of currency bills from the currency bill storage device at various locations over a time period) and known outputs (e.g., transactions that occurred at the various locations over the time period). In some implementations, the user device may refine a machine learning algorithm based on feedback received from a user of the user device and/or from one or more other devices (e.g., management device(s)). For example, the user of the user device and/or one or more management devices may provide information indicating whether predictions of upcoming transactions, made by the machine learning algorithm, are accurate and/or helpful. When the information indicates that a particular prediction is accurate and/or helpful, the user device may configure the machine learning algorithm to make predictions of upcoming transactions based on the particular prediction (e.g., to predict upcoming transactions in a manner similar to that in which the particular prediction was made). When the information indicates that a particular prediction is not accurate or helpful, the user device may configure the machine learning algorithm to avoid predicting upcoming transactions in a manner in which the particular prediction was made. In this way, the user device can predict upcoming transactions based on a machine learning algorithm, which improves the accuracy of the predictions, and conserves processor and/or storage resources that may otherwise be used to generate and store rules for predicting upcoming transactions.

As shown by reference number 180, the user device may provide alert(s) regarding the balance of currency bills based on the monitored user activity. For example, in a case where there are insufficient funds in the currency bill storage device, the user device may provide one or more alerts (e.g., audibly, haptically, and/or the like) regarding the potential insufficiency of funds. This permits the user to obtain additional funds as needed for an upcoming transaction.

In some implementations, and in a case where the user device maintains not only a current balance in the currency bill storage device, but also tracks a quantity of currency bills that correspond to each of one or more denominations (e.g., as described above), the user device may determine whether currency bill(s) of certain denominations, that correspond to what the user is expected to spend, are available in the currency bill storage device. For example, if the current balance in the currency bill storage device is $10 (made up of a single $10 bill), and if the user is expected to visit a location and spend $2 (e.g., for valet parking), the user device may (e.g., despite the current balance in the currency bill storage device being sufficient relative to the two dollars that the user is expected to spend) provide an alert that indicates that the currency bill storage device does not contain sufficient $1 bills for the upcoming transaction.

In some implementations, the user device may provide the alert based on a current location of the user (e.g., of the user device and/or the currency bill storage device). For example, the user device may provide the alert when the user moves a threshold distance from a current location, towards a location at which the user will likely, or is expected to, spend a certain amount of money (e.g., when the user begins to travel from the user's home to the mall).

In some cases, the image sensor might not capture image(s) of one or more currency bills in the currency bill storage device. For example, the image sensor might not have detected a currency bill being inserted into the currency bill storage device. In some implementations, the user device may be capable of permitting a user of the currency bill storage device to reset (e.g., via a user input, such as by a selection of an option (e.g., a button and/or the like) presented on a user interface of the user device) information relating to the balance in the currency bill storage device and/or information regarding quantities of currency bills corresponding to one or more denominations (e.g., to reset the balance to $0 and/or to reset a value of a quantity of $1 bills to zero, a value of a quantity of $5 bills to zero, etc.). The user may remove all currency bills from the currency bill storage device, and begin anew by re-inserting each currency bill into the currency bill storage device (e.g., one at a time) to permit the image sensor to capture images of each currency bill for balance tracking purposes and/or the like.

As described above, the currency bill storage device may be configured to capture images of documents and/or objects other than currency bills (e.g., ID cards, credit cards, business cards, gift cards, receipts, transportation-related cards, and/or the like). In some implementations, the currency bill storage device may include one or more additional image sensors (e.g., in addition to the image sensor(s) for capturing images of currency bills) for capturing images of such documents and/or objects. For example, the currency bill storage device may include a camera (e.g., one or more cameras) disposed outside of the inner storage area of the currency bill storage device, such as on a portion of the currency bill storage device that faces a user when the currency bill storage device is in an open position. As an example, in a case where the currency bill storage device includes a tri-fold wallet, the additional camera may be disposed at a center portion of the wallet that faces a user when the wallet is in an open position. In this way, a user can easily position a document and/or object in front of the image sensor for image capturing purposes. Additionally, or alternatively, the currency bill storage device may not include any such additional image sensors, in which case the image sensor(s) (e.g., those image sensor(s) located within the inner storage area of the currency bill storage device for capturing images of currency bills) may also be used to capture images of documents and/or objects other than currency bills.

In some implementations, the user device may store and/or have access to a repository of data relating to documents and/or objects other than currency bills, such as data relating to the type of information that is typically presented on credit cards (e.g., credit card numbers, expiration dates, and/or the like), the type of information that is typically presented on business cards (e.g., company logos, contact information, and/or the like), and/or the like, and may utilize this data to identify documents and/or objects. For example, the user device may process (e.g., using optical character recognition and/or the like) an image, of a document and/or object, received from the currency bill storage device, and compare the data in the repository and information contained in the image(s) to identify the document and/or object.

In some implementations, the user device may provide alerts (e.g., audio-based alerts, haptic-based alerts, and/or the like), based on the images of documents and/or objects, in a manner similar to that for providing alerts relating to currency bills described above. For example, the user device may provide alerts that indicate, to a user, a type of a document and/or object (e.g., that an object is a credit card, a business card, etc.) and/or the like. In some implementations, the user device may automatically create or populate data structures of one or more applications (e.g., entries in a contact list application of the user device and/or the like) based on an identified document and/or object.

In some implementations, the repository of data may include data that is learned over time (e.g., by the user device, by one or more other user devices, and/or the like using one or more machine learning algorithms and/or processes), which improves the user device's ability to properly identify documents and/or objects.

Although various steps or actions are described in connection with FIGS. 1A and 1B as being performed by a user device, in some implementations, the currency bill storage device may perform some or all of such steps or actions. For example, in some implementations, the currency bill storage device may determine denominations of currency bills based on captured images of the currency bills and/or provide alerts regarding such denominations (e.g., in manners similar to those described above in connection with reference numbers 130 and 140). Additionally, or alternatively, and as another example, the currency bill storage device may track the balance in the currency bill storage device, monitor user activity relating to currency bill usage over time, determine upcoming transactions based on such user activity, and/or provide alerts relating to the balance and such upcoming transactions (e.g., in manners similar to those described above in connection with reference numbers 150, 160, 170, and 180). In such cases, for example, the currency bill storage device may include components suitable for providing audible and/or haptic alerts, and may include sufficient memory and processing power for storing and executing logic and/or application(s) useful for determining currency bill denominations, tracking and/or learning currency bill usage patterns, and/or the like.

In this way, a visually impaired user can easily identify the denominations of currency bills using a currency bill storage device that is in a familiar form factor (e.g., a wallet, a purse, and/or the like), which reduces or eliminates a need for the user to purchase and/or utilize a separate bill reader (which may be difficult to operate and/or cumbersome to carry around), thereby reducing costs. In addition, the tracking of a balance in a currency bill storage device and the monitoring of user activity relating to currency bill usage enables banking to be more accessible to a visually impaired user, and reduces a need for the user to install and/or utilize other financial management applications on a user device, which conserves power, computing resources, and memory resources of the user device.

As indicated above, FIGS. 1A and 1B are provided merely as examples. Other examples are possible and may differ from what was described with regard to FIGS. 1A and 1B.

Figure 2:
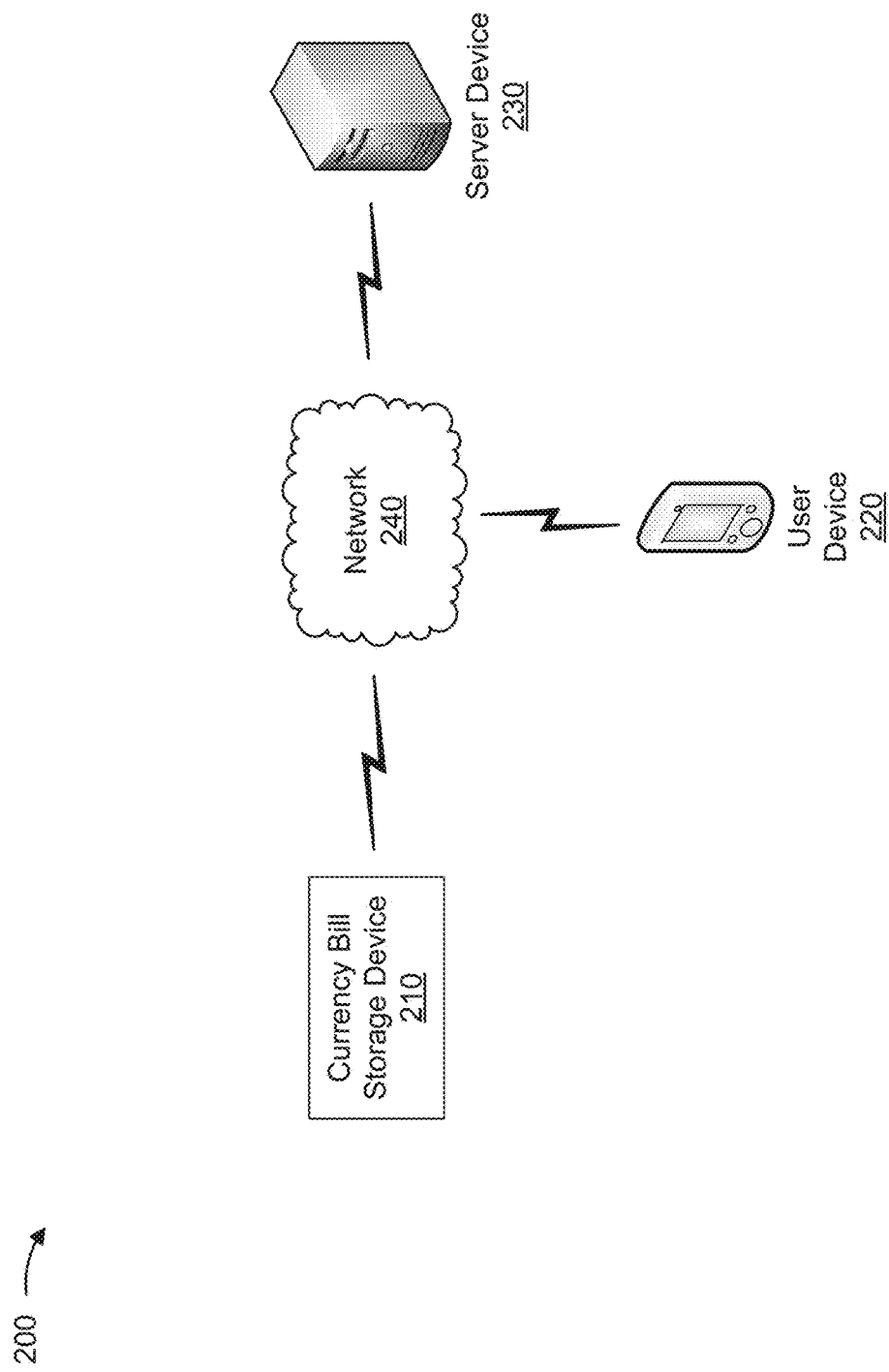
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include currency bill storage device 210, user device 220, and/or server device 230. Devices of environment 200 may interconnect via wired connections, wireless connections, or a combination of wired and wireless connections.

Currency bill storage device 210 includes a device that is capable of storing financial instruments, such as currency bills, credit cards, business cards, documents, and/or other like objects. For example, currency bill storage device 210 may include a wallet (e.g., a bi-fold wallet, a tri-fold wallet, a billfold, and/or the like), a purse (e.g., a coin purse), and/or the like. Currency bill storage device 210 may include (e.g., may be equipped with) one or more components capable of receiving, processing, generating, determining, and/or providing information (e.g., to and/or from user device 220 and/or server device 230). In some implementations, currency bill storage device 210 may include one or more image sensors (e.g., cameras), one or more power sources (e.g., batteries), one or more wired and/or wired communication interfaces (e.g., Bluetooth interface(s), Wi-Fi interface(s), and/or the like), and various other components, as described elsewhere herein. In some implementations, currency bill storage device 210 may be capable of capturing images (e.g., using the image sensor(s)) of currency bills and/or the like, and providing the images, and/or information relating to the images, to user device 220 and/or server device 230, as described elsewhere herein.

User device 220 includes one or more devices capable of receiving, generating, storing, processing, and/or providing information associated with currency bill storage device 210 and/or server device 230. For example, user device 220 may include a communication and/or computing device, such as a mobile phone (e.g., a smart phone, a radiotelephone, etc.), a desktop computer, a laptop computer, a tablet computer, a handheld computer, a gaming device, a wearable communication device (e.g., a smart wristwatch, a pair of smart eyeglasses, etc.), or a similar type of device. In some implementations, user device 220 may output data (e.g., alerts) relating to information (e.g., images) provided by currency bill storage device 210, as described elsewhere herein.

Server device 230 includes one or more devices capable of receiving, storing, providing, generating, and/or processing information associated with currency bill storage device 210 and/or user device 220. For example, server device 230 may include a server device or a group of server devices (e.g., associated with a multi-server micro data center), a workstation computer or a group of workstation computers, a virtual machine (VM) or a group of virtual machines (VMs) implemented by one or more computing devices provided in a cloud computing environment, or a similar type or group of devices. In some implementations, server device 230 may communicate data relating to images captured by currency bill storage device 210, as described elsewhere herein.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
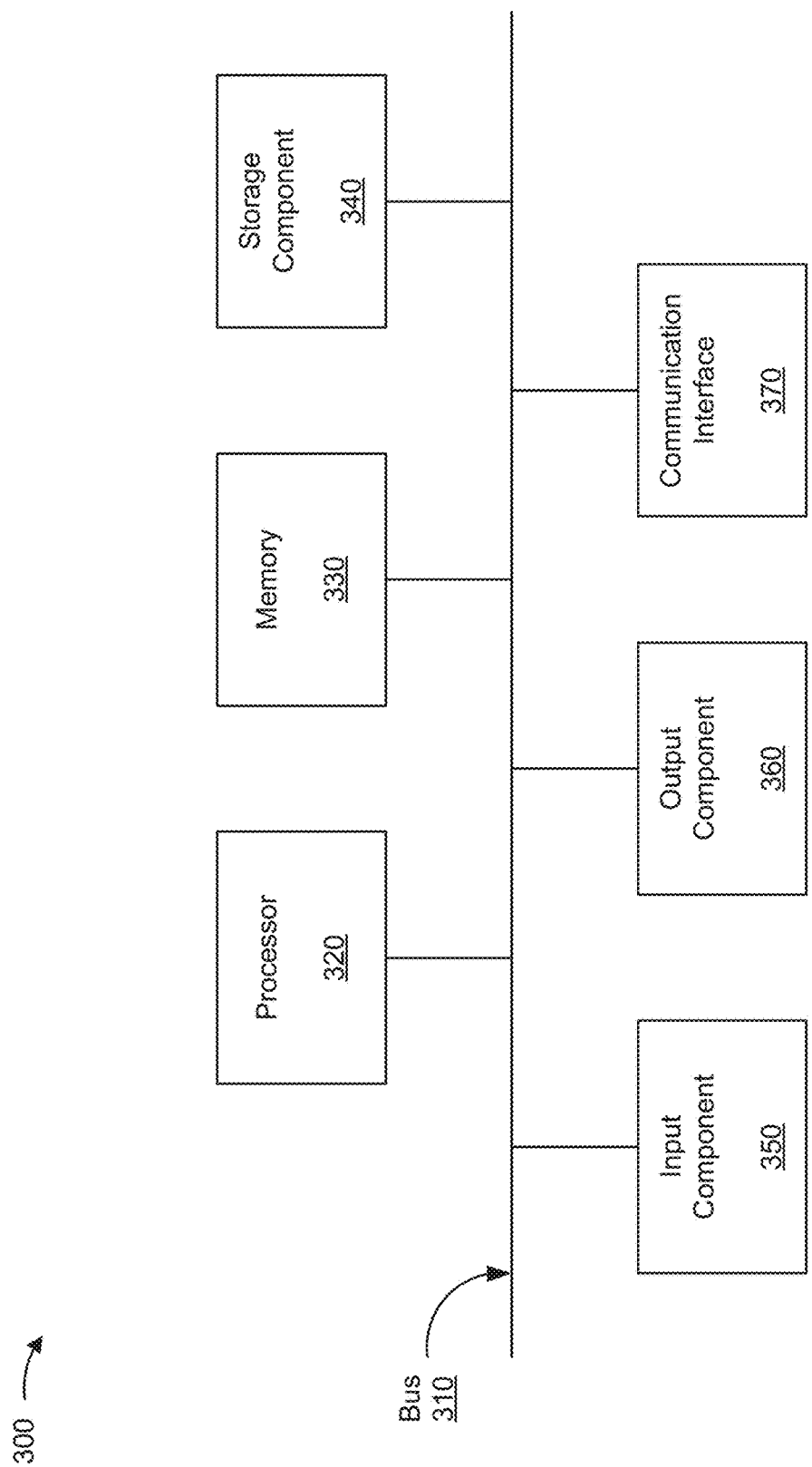
FIG. 3 is a diagram of example components of one or more devices of FIG. 2.

FIG. 3 is a diagram of example components of a device 300. Device 300 may correspond to currency bill storage device 210, user device 220, and/or server device 230. In some implementations, currency bill storage device 210, user device 220, and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for providing alerts based on user activity relating to currency bill usage. In some implementations, one or more process blocks of FIG. 4 may be performed by user device 220. In some implementations, one or more process blocks of FIG. 4 may be performed by another device or a group of devices separate from or including user device 220, such as currency bill storage device 210 and/or server device 230.

As shown in FIG. 4, process 400 may include monitoring activity associated with a user of a currency bill storage device based on currency bill data received from the currency bill storage device over a period of time (block 410). For example, user device 220 (e.g., using processor 320, memory 330, storage component 340, communication interface 370, and/or the like) may monitor activity associated with a user of currency bill storage device 210 based on currency bill data received from currency bill storage device 210 over a period of time, as described above in connection with FIGS. 1A and 1B In some implementations, the currency bill storage device may include one or more image sensors configured to capture images of currency bills. In some implementations, the currency bill data may be based on the images.

As further shown in FIG. 4, process 400 may include tracking a balance in the currency bill storage device based on the currency bill data (block 420). For example, user device 220 (e.g., using processor 320, memory 330, storage component 340, communication interface 370, and/or the like) may track a balance in currency bill storage device 210 based on the currency bill data, as described above in connection with FIGS. 1A and 1B.

As further shown in FIG. 4, process 400 may include identifying, based on the activity, an upcoming transaction in which the user is expected to utilize a particular quantity of currency bills in the currency bill storage device (block 430). For example, user device 220 (e.g., using processor 320, memory 330, storage component 340, communication interface 370, and/or the like) may identify, based on the activity, an upcoming transaction in which the user is expected to utilize a particular quantity of currency bills in currency bill storage device 210, as described above in connection with FIGS. 1A and 1B.

As further shown in FIG. 4, process 400 may include determining whether the balance is sufficient relative to the particular quantity of currency bills (block 440). For example, user device 220 (e.g., using processor 320, memory 330, storage component 340, communication interface 370, and/or the like) may determine whether the balance is sufficient relative to the particular quantity of currency bills, as described above in connection with FIGS. 1A and 1B.

As further shown in FIG. 4, process 400 may include performing one or more actions to cause an alert to be provided to the user based on determining whether the balance is sufficient relative to the particular quantity of currency bills (block 450). For example, user device 220 (e.g., using processor 320, memory 330, storage component 340, output component 360, communication interface 370, and/or the like) may perform one or more actions to cause an alert to be provided to the user based on determining whether the balance is sufficient relative to the particular quantity of currency bills, as described above in connection with FIGS. 1A and 1B.

Process 400 may include additional implementations, such as any single implementation or any combination of implementations described below and/or in connection with FIG. 5.

In some implementations, currency bill storage device 210 may include a wallet, a billfold, and/or a purse. In some implementations, user device 220 may perform the one or more actions prior to an occurrence of the upcoming transaction.

In some implementations, the currency bill data may include information that identifies denominations of one or more currency bills. In some implementations, the currency bill data may include the images, and user device 220 may process the images to determine denominations of one or more currency bills, identify one or more alerts (e.g., one or more audio-based alerts or one or more haptic-based alerts) to be provided based on the denominations, and cause one or more additional alerts to be presented to the user to enable the user to identify the denominations.

In some implementations, user device 220 may perform the one or more actions to cause the alert to be provided to the user based on determining that the balance is insufficient relative to the particular quantity of currency bills. In some implementations, user device 220 may update a value of the balance based on the currency bill data or may update values associated with quantities of currency bills corresponding to different denominations.

In some implementations, user device 220 may include one or more memories, and one or more processors, communicatively coupled to the one or more memories, configured to monitor activity associated with a user of a wallet or a purse (e.g., a currency bill storage device 210) based on currency bill data received from the wallet or the purse over a period of time. In some implementations, the wallet or the purse may include one or more image sensors configured to capture images of currency bills. In some implementations, the currency bill data may be based on the images. In some implementations, the one or more processors of user device 220 may track a balance in the wallet or the purse based on the currency bill data, identify, based on the activity, an upcoming transaction in which the user is expected to utilize a quantity of currency bills in the wallet or the purse, determine whether the balance is sufficient relative to the quantity of currency bills in the wallet or the purse after identifying the upcoming transaction, and perform one or more actions to cause an alert to be provided to the user based on determining that the balance is insufficient relative to the quantity of currency bills.

In some implementations, user device 220 may detect one or more patterns of currency bill usage by the user at or near one or more locations. In some implementations, user device 220 may detect one or more patterns of currency bill usage by the user at a certain time of day. In some implementations, user device 220 may determine whether a currency bill is being inserted into the wallet or the purse or being removed from the wallet or the purse based on the currency bill data, and track the balance further based on determining whether the currency bill is being inserted into the wallet or the purse or being removed from the wallet or the purse. In some implementations, user device 220 may determine whether a currency bill is being inserted into the wallet or the purse or being removed from the wallet or the purse based on the currency bill data, and monitor the activity further based on determining whether the currency bill is being inserted into the wallet or the purse or being removed from the wallet or the purse.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for providing alerts based on detected currency bill denominations. In some implementations, one or more process blocks of FIG. 5 may be performed by user device 220. In some implementations, one or more process blocks of FIG. 5 may be performed by another device or a group of devices separate from or including user device 220, such as currency bill storage device 210 and/or server device 230.

As shown in FIG. 5, process 500 may include receiving, from a currency bill storage device, one or more images of a currency bill (block 510). For example, user device 220 (e.g., using processor 320, memory 330, storage component 340, input component 350, communication interface 370, and/or the like) may receive, from currency bill storage device 210, one or more images of a currency bill, as described above in connection with FIGS. 1A and 1B. In some implementations, currency bill storage device 210 may be a wallet or a purse. In some implementations, the one or more images may be captured by one or more image sensors.

As further shown in FIG. 5, process 500 may include performing an action relating to the one or more images to determine a denomination of the currency bill (block 520). For example, user device 220 (e.g., using processor 320, memory 330, storage component 340, communication interface 370, and/or the like) may perform an action relating to the one or more images to determine a denomination of the currency bill, as described above in connection with FIGS. 1A and 1B.

As further shown in FIG. 5, process 500 may include identifying an alert to be provided based on determining the denomination of the currency bill (block 530). For example, user device 220 (e.g., using processor 320, memory 330, storage component 340, communication interface 370, and/or the like) may identify an alert to be provided based on determining the denomination of the currency bill, as described above in connection with FIGS. 1A and 1B. In some implementations, the alert may include an audio-based alert or a haptic-based alert.

As further shown in FIG. 5, process 500 may include causing the alert to be presented to a user of the currency bill storage device to enable the user to identify the denomination of the currency bill (block 540). For example, user device 220 (e.g., using processor 320, memory 330, storage component 340, output component 360, communication interface 370, and/or the like) may cause the alert to be presented to a user of currency bill storage device 210 to enable the user to identify the denomination of the currency bill, as described above in connection with FIGS. 1A and 1B.

Process 500 may include additional implementations, such as any single implementation or any combination of implementations described below and/or in connection with FIG. 4.

In some implementations, currency bill storage device 210 may include a single image sensor. In some implementations, the one or more images may include a plurality of images that are captured sequentially by the single image sensor. In some implementations, user device 220 may process the one or more images to determine the denomination of the currency bill. In some implementations, user device 220 may provide the one or more images to an external device for analysis, and receive a result of the analysis from the external device. In some implementations, user device 220 may identify an error condition relating to the one or more images, and cause a notification to be provided to the user to prompt the user to perform one or more actions with regard to the currency bill.

In some implementations, user device 220 may cause the notification to be provided to the user to prompt the user to position the currency bill relative to a position of the one or more image sensors of currency bill storage device 210. In some implementations, user device 220 may receive the one or more images of the currency bill via a wireless interface.

In some implementations, user device 220 may monitor activity associated with the user based on the one or more images, track a balance in currency bill storage device 210 based on the one or more images, and identify, based on the activity, an upcoming transaction in which the user is expected to utilize a particular quantity of currency bills in currency bill storage device 210. In some implementations, user device 220 may determine that the balance is insufficient relative to the particular quantity of currency bills, and cause an additional alert to be provided to the user based on determining that the balance is insufficient relative to the particular quantity of currency bills.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Some implementations, described herein, provide a currency bill storage device 210 (e.g., a physical wallet, a purse, and/or the like) that is capable of capturing images of currency bills, and providing the images, and/or information relating to the images, to a user device 220. In some implementations, user device 220 is capable of providing alerts (e.g., audible and/or haptic alerts) regarding denominations of the currency bills based on the images or information. In some implementations, user device 220 may monitor a user's activities relating to usage of currency bills (e.g., at various locations over time), track a balance of currency bills in currency bill storage device 210, and provide alerts to the user regarding the balance and any potential upcoming transactions in which the user is expected to utilize a certain quantity of currency bills corresponding to an amount that exceeds the balance.

In this way, a visually impaired user can easily identify the denominations of currency bills using a currency bill storage device that is in a familiar form factor (e.g., a wallet, a purse, and/or the like), which reduces or eliminates a need for the user to purchase and/or utilize a separate bill reader (which may be difficult to operate and/or cumbersome to carry around), thereby reducing costs. In addition, the tracking of a balance in a currency bill storage device and the monitoring of user activity relating to currency bill usage enables banking to be more accessible to a visually impaired user, and reduces a need for the user to install and/or utilize other financial management applications on a user device, which conserves power, computing resources, and memory resources of the user device.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method, comprising:
   receiving, by a user device and from a currency bill storage device, one or more images of a currency bill, wherein the currency bill storage device is one of:
   a wallet,
   a billfold,
   a pocketbook, or
   a purse;
   performing, by the user device, an action relating to the one or more images to determine a denomination of the currency bill;
   causing, by the user device, a first alert to be provided to a user of the currency bill storage device to provide information identifying the denomination of the currency bill;
   updating, by the user device and based on the denomination of the currency bill, a balance associated with the currency bill storage device; and
   causing, by the user device, a second alert to be provided to the user of the currency bill storage device to provide information identifying the updated balance.

2. The method of claim 1, wherein the one or more images are captured by image sensors included in the currency bill storage device.

3. The method of claim 1, wherein performing the action relating to the one or more images to determine the denomination of the currency bill includes:
   comparing the one or more images to stored images of different denominations.

4. The method of claim 1, further comprising:
   determining a denomination of another currency bill cannot be determined; and
   providing a prompt to reinsert the other currency bill into the currency bill storage device.

5. The method of claim 1, further comprising:
   determining that an object other than a currency bill has been inserted into the currency bill storage device; and
   providing a notification that the object other than the currency bill has been inserted into the currency bill storage device.

6. The method of claim 1, further comprising:
   determining a location of the currency bill storage device;
   determining an appropriate currency that is used at the location;

detecting a currency bill in a different currency than the appropriate currency is removed from the currency bill storage device; and causing a third alert to be provided that indicates the different currency is removed from the currency bill storage device.

7. A device, comprising:

one or more memories; and one or more processors, communicatively coupled to the one or more memories, configured to:

receive, from a currency bill storage device, one or more images of a currency bill, wherein the currency bill storage device is one of:

a wallet, a billfold, a pocketbook, or a purse;

perform an action relating to the one or more images to determine a denomination of the currency bill;

cause a first alert to be provided to a user of the currency bill storage device to provide information identifying the denomination of the currency bill;

update, based on the denomination of the currency bill, a balance associated with the currency bill storage device; and cause a second alert to be provided to the user of the currency bill storage device to provide information identifying the updated balance.

8. The device of claim 7, wherein the one or more images are captured by image sensors included in the currency bill storage device.

9. The device of claim 7, wherein the one or more processors, when performing the action relating to the one or more images to determine the denomination of the currency bill, are to:

compare the one or more images to stored images of different denominations.

10. The device of claim 7, wherein the one or more processors are further to:

determine a denomination of another currency bill cannot be determined; and provide a prompt to reinsert the other currency bill into the currency bill storage device.

11. The device of claim 7, wherein the one or more processors are further to:

determine that an object other than a currency bill has been inserted into the currency bill storage device; and provide a notification that the object other than the currency bill has been inserted into the currency bill storage device.

12. The device of claim 7, wherein the one or more processors are further to:

determine a location of the currency bill storage device;

determine an appropriate currency that is used at the location;

detect a currency bill in a different currency than the appropriate currency is removed from the currency bill storage device; and cause a third alert to be provided that indicates the different currency is removed from the currency bill storage device.

13. A non-transitory computer-readable medium storing instructions, the instructions comprising:

one or more instructions that, when executed by one or more processors, cause the one or more processors to:

receive, from a currency bill storage device, one or more images of a currency bill, wherein the currency bill storage device is one of:

a wallet;

a billfold, a pocketbook, or a purse;

perform an action relating to the one or more images to determine a denomination of the currency bill;

cause a first alert to be provided to a user of the currency bill storage device to provide information identifying the denomination of the currency bill;

update, based on the denomination of the currency bill, a balance associated with the currency bill storage device; and cause a second alert to be provided to the user of the currency bill storage device to provide information identifying the updated balance.

14. The non-transitory computer-readable medium of claim 13, wherein the one or more images are captured by image sensors included in the currency bill storage device.

15. The non-transitory computer-readable medium of claim 13, wherein the one or more instructions, that cause the one or more processors to perform the action relating to the one or more images to determine the denomination of the currency bill, cause the one or more processors to:

compare the one or more images to stored images of different denominations.

16. The non-transitory computer-readable medium of claim 13, wherein the one or more instructions, when executed by the one or more processors, further cause the one or more processors to:

determine a denomination of another currency bill cannot be determined; and provide a prompt to reinsert the other currency bill into the currency bill storage device.

17. The non-transitory computer-readable medium of claim 13, wherein the one or more instructions, when executed by the one or more processors, further cause the one or more processors to:

determine that an object other than a currency bill has been inserted into the currency bill storage device; and provide a notification that the object other than the currency bill has been inserted into the currency bill storage device.

18. The non-transitory computer-readable medium of claim 13, wherein the one or more instructions, when executed by the one or more processors, further cause the one or more processors to:

determine a location of the currency bill storage device;

determine an appropriate currency that is used at the location;

detect a currency bill in a different currency than the appropriate currency is removed from the currency bill storage device; and cause a third alert to be provided that indicates the different currency is removed from the currency bill storage device.

19. The method of claim 1, wherein the first alert comprises an audible alert indicating the denomination of the currency bill.

20. The device of claim 7, wherein the first alert comprises a haptic alert indicating the denomination of the currency bill.

* * * * *